(12) United States Patent
Kurakake et al.

(10) Patent No.: US 7,164,965 B2
(45) Date of Patent: Jan. 16, 2007

(54) NUMERICAL CONTROLLER AND SERVOMOTOR CONTROL SYSTEM

(75) Inventors: Mitsuo Kurakake, Tokyo (JP); Kazunari Aoyama, Yamanashi (JP); Kunitaka Komaki, Yamanashi (JP); Yasuharu Aizawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/138,266

(22) Filed: May 27, 2005

(65) Prior Publication Data
US 2005/0267625 A1 Dec. 1, 2005

(30) Foreign Application Priority Data
May 28, 2004 (JP) .............................. 2004/159610

(51) Int. Cl.
*G06F 19/00* (2006.01)
(52) U.S. Cl. ...................................... 700/177; 318/569
(58) Field of Classification Search ................. 700/56, 700/58, 61, 245, 251, 95, 177, 169, 173, 700/187, 127, 204, 208, 21; 318/569, 568.13, 318/599; 709/212
See application file for complete search history.

(56) References Cited

U.S. PATENT DOCUMENTS

| | | | |
|---|---|---|---|
| 5,850,338 A | | 12/1998 | Fujishima et al. |
| 5,990,638 A | | 11/1999 | Aoyama et al. |
| 5,994,861 A | * | 11/1999 | Tutumishita ................. 318/562 |
| 6,147,469 A | * | 11/2000 | Uchida et al. ............... 318/675 |
| 6,442,444 B1 | * | 8/2002 | Matsubara et al. ............ 700/95 |
| 6,791,294 B1 | * | 9/2004 | Kazama et al. .............. 318/677 |
| 2002/0010520 A1 | * | 1/2002 | Matsubara et al. ............ 700/95 |
| 2004/0210339 A1 | * | 10/2004 | Ogino et al. ................. 700/177 |

FOREIGN PATENT DOCUMENTS

| | | |
|---|---|---|
| EP | 0846993 | 10/1998 |
| EP | 0887719 | 12/1998 |
| GB | 2373618 | 9/2002 |

* cited by examiner

*Primary Examiner*—Kidest Bahta
(74) *Attorney, Agent, or Firm*—Staas & Halsey LLP

(57) ABSTRACT

A numerical controller and a servomotor control system, capable of axis control required in case of a communication failure in the control of servomotors driven by servo amplifiers connected to a plurality of serial buses. The numerical controller has a plurality of serial buses to which the numerical controller and a plurality of servo amplifiers are daisy-chain-connected and controls servomotors connected individually to the servo amplifiers. The device comprises a plurality of communication control circuits for detecting respective communication failures of the serial buses and selecting means for selecting whether or not to notify the other communication control circuits of a communication failure, if any, of any one of the communication control circuits detected thereby. In the control of the servomotors driven by the servo amplifiers connected to the serial buses, an output of a servo amplifier connected to a serial bus that suffers a communication failure is reduced to 0 so that outputs to the servo amplifiers connected to the remaining normal serial buses can be maintained.

7 Claims, 4 Drawing Sheets

NUMERICAL CONTROLLER AND SERVOMOTOR CONTROL SYSTEM

BACKGROUND OF THE INVENTION

1. Field of the Invention

The present invention relates to control of servomotors, and more particularly, to a control system for controlling servomotors driven by a plurality of daisy-chain-connected servo amplifiers and a numerical controller.

2. Description of the Related Art

FIG. 5 shows an example of a system configuration for controlling conventional servomotors. In FIG. 5, servomotors 41, 42, 43, 61, 62 and 63 are driven by servo amplifiers 31, 32, 33, 51, 52 and 53, respectively.

The servo amplifiers 31 to 33 and servo amplifiers 51 to 53 are daisy-chain-connected to a numerical controller 11 by optical cables. Thus, the numerical controller 11 is provided with a plurality of optical connectors (connectors #1 and #2 in FIG. 5) for communication. The number of connectable servo amplifier is increased by controlling a plurality of serial buses (two buses in FIG. 5). These serial buses constitute a plurality of communication lines (communication lines #1 and #2 in FIG. 5).

Data for the servo amplifiers, such as current commands and the like for driving the motors, are transmitted from the numerical controller 11 to the first servo amplifier 31 (or 51) through a serial bus. On receiving the data from the numerical controller 11, the first servo amplifier 31 (or 51) captures its necessary data among the received data and transfers data for the other servo amplifiers 32 and 33 (or 52 and 53) to the daisy-chain-connected second servo amplifier 32 (or 52) on its downstream side through another serial bus.

Likewise, the second servo amplifier 32 (or 52) captures its necessary data and transfers data for the third servo amplifier 33 (or 53) to the amplifier 33 (or 53) on its downstream side through still another serial bus.

Although the three servo amplifiers are daisy-chain-connected in the example shown in FIG. 5, more servo amplifiers may be connected. The third and subsequent servo amplifiers also capture their necessary data and transfer data for the other servo amplifiers to the additional amplifiers on their downstream side through additional serial buses. This delivery of the data enables data transmission from the numerical controller 11 to all the daisy-chain-connected servo amplifiers.

On the other hand, data such as feedback signals from the servo amplifiers 41 to 43 (or 61 to 63) are transmitted from the daisy-chain-connected servo amplifiers 31 to 33 (or 51 to 53) to the numerical controller 11. The servo amplifiers 32 and 33 (or 52 and 53) transmit the feedback signals or other data for the numerical controller 11 to the servo amplifiers 31 and 32 (or 51 and 52) that are connected to the upstream side of the serial buses.

The upstream-side servo amplifiers transmit the received data, along with their own data precedent thereto, to the servo amplifiers on their upstream side. As all the servo amplifiers transmit and receive data in like manner, the data from all the servo amplifiers are transmitted to the numerical controller 11.

If a communication line between the numerical controller 11 and the first servo amplifier 31 (or 51) or a line between any two adjacent servo amplifiers undergoes any trouble or if any servo amplifier suffers a failure, the daisy-chain-connected serial buses are disabled from communication. If the serial buses suffer any communication failure, current commands from the numerical controller fail to reach the servo amplifiers on the downstream side of the communication line or the servo amplifier in trouble. If the current commands from the numerical controller cease to reach the servo amplifiers in this manner, the motors are rendered uncontrollable and can possibly run recklessly.

Therefore, the servo amplifiers are expected to continually monitor the communication lines and reduce power outputs to the motors to prevent them from running recklessly if any abnormality is detected on the communication lines. If no external force is applied, as in the case of a gravity axis, the motors cannot be stopped by external force by only reducing the outputs to the motors to 0, so that the motors must be braked simultaneously.

Also if the numerical controller undergoes any failure and stops communication, on the other hand, all the servo amplifiers that are connected to the stopped communication lines must detect the communication failure and reduce the power outputs to the motors to 0, thereby preventing the motors from running recklessly.

FIG. 6 is a schematic diagram for illustrating a system configuration of the numerical controller. The numerical controller 11 is mounted with a CPU 12, DRAM 21, SRAM 22, flash memory 23, DSP 25, common RAM 24, serial communication LSI 13 for serial communication with the servo amplifiers, and optical modules 14A and 14B.

The CPU 12 can access the DRAM 21, SRAM 22, flash memory 23, and common RAM 24 through serial buses 20. Normally, the common RAM 24 is formed of an SRAM, and data is transferred between the CPU 12 and the DSP 25 via the common RAM 24. When the CPU 12 writes an amount of movement to the common RAM 24 with every given period, the DSP 25 reads the amount of movement from the RAM 24, calculates current command values for the individual motors, and transmits the values to the servo amplifiers through the serial communication LSI 13, optical modules 14A and 14B, and serial buses.

On the other hand, motor current values, motor position information, etc. are transmitted from the servo amplifiers to the DSP 25 through the serial buses, optical modules 14A and 14B, and serial communication LSI 13.

The serial communication LSI 13 has CH.1 and CH.2 for transmission and reception of serial signals. Electrical signals delivered from CH.1 and CH.2 are subjected to electrical-to-optical conversion by the optical modules 14A and 14B, transmitted to the communication lines #1 and #2, and delivered to the individual servo amplifiers. Further, the feedback signals from the servo amplifiers are transmitted to the optical modules 14A and 14B through the communication lines #1 and #2, and subjected to optical-to-electrical conversion. The converted electrical signals are delivered to the serial communication LSI 13 through CH.1 or CH.2.

FIG. 7 is a block diagram showing an example of a serial communication LSI of the conventional numerical controller.

The serial communication LSI 13 comprises a first communication control circuit 15A and a second communication control circuit 15B for controlling the communication line #1 and the communication line #2, respectively. The communication control circuits 15A and 15B transmit and receive serial data.

Further, the communication control circuits 15A and 15B monitors the states of the communication lines. If the communication lines suffer any failure, the control circuits 15A and 15B detect the occurrence of the failure and notify the CPU of the numerical controller of it. On receiving this notification of the occurrence of the failure, the CPU proceeds to an NMI (non-maskable interrupt) routine, in which it stops the system.

If a system alarm is generated in an external circuit of the serial communication LSI 13, the LSI 13 is internally notified of an alarm state through its system alarm input. Further, the alarm is delivered to alarm inputs of the communication control circuits 15A and 15B. On receiving the alarm, the control circuits 15A and 15B stop communication with the communication lines #1 and #2.

When the communication from the communication control circuits 15A and 15B is stopped, all the servo amplifiers that are connected to the communication lines#1 and #2 detect the communication failure and make the outputs to the servomotors zero, as mentioned before.

If the communication control circuit 15A detects any communication failure on the communication line #1, moreover, it issues a communication alarm and notifies the exterior of the serial communication LSI 13 of it. At the same time, internal circuits (OR circuits 18 and 19) of the LSI 13 notifies the other communication control circuit 15B of the alarm.

In contrast with this, the communication control circuit 15B notifies the exterior of the serial communication LSI 13 of the detected communication alarm on the communication line #2, while the internal circuits (OR circuits 18 and 19) of the LSI 13 notifies the other communication control circuit 15A of the alarm.

This is done because the communication alarm is a cause of system interruption and that the system interruption is a cause of communication interruption.

Described in JP 10-13394A is an example of a numerical controller such that servo amplifiers and the numerical controller are connected by serial buses, through which data for servomotor control are transferred.

If a communication alarm is issued when a communication failure is detected in one communication control circuit, in a system for controlling conventional servomotors, the alarm is also instantly transmitted to the other communication control circuit, whereupon all communication control circuits stop communication.

Also if a system alarm is generated in a system on the numerical controller side, it is instantly transmitted to all the communication control circuits, which then stop communication.

If the communication with the communication lines stops, the servo amplifiers reduce the outputs to the motors to 0, as mentioned before. In the case of the gravity axis, the outputs from the servo amplifiers to the motors are reduced to 0 before the axis braked by control on the system side. In the worst case, therefore, the axis may possibly drop and damage a workpiece or the machine.

If the communication with the communication lines stops, moreover, the outputs from the servo amplifiers to the motors are only reduced to 0, so that necessary axis control processing for safety, such as an emergency stop or retraction, cannot be performed.

SUMMARY OF THE INVENTION

The present invention enables axis control required in case of a communication failure in the control of servomotors driven by servo amplifiers which are connected to a plurality of serial buses. Even if there occurs an abnormality in any of the serial buses, the servo amplifiers which are connected to the other serial buses can be controlled. Thus, the machine can be prevented from being damaged, and an operator's safety can be improved.

According to an aspect of the present invention, there is provided a numerical controller for controlling servomotors through servo amplifiers respectively connected thereto by performing communications with the servo amplifiers by a plurality of serial buses in daisy-chain. The numerical controller comprises: a plurality of communication control circuits for respectively controlling the communications by the plurality of serial buses and detecting a communication failure in any of the plurality of serial buses; and selecting means for selecting notification or non-notification of the communication failure detected by any of the communication control circuits to the other communication control circuits.

The selecting means may select notification or non-notification of the communication failure based on a communication alarm selection signal issued according to fixed setting in the numerical controller or according to parameter setting by a user.

The communication control circuits stop or continue the communications by the serial buses in response to the notification or non-notification of the communication failure. Further, the communication control circuits may stop the communications by the serial buses in response to an alarm of system failure in the numerical controller.

With the above arrangement, the communication failure is not notified to the communication control circuits for communication with the servo amplifiers which are required to continue the control, while the communication failure is notified to the communication control circuits for communication with the servo amplifiers which are not required to continue the control.

Thus, in case of the communication failure, the servo amplifiers for the servomotors which are required to be controlled can continue to control the servomotors to be stopped or driven to stop at predetermined positions, since the communication is maintained between the numerical controller and the servo amplifiers for the servomotors which are required to be controlled. When the communication control circuit stops the communications by the serial buses, outputs of the servo amplifiers connected to the serial buses are made zero.

The serial buses may include a first serial bus to which servo amplifiers for controlling axes subjected to gravitation are connected and a second serial bus to which servo amplifiers for controlling axes other than the axes subjected to gravitation are connected. In this case, the communication failure is not notified to the communication control circuit for communication with the servo amplifiers for controlling the axes subjected to gravitation, while the communication failure is notified to the communication control circuit for communication with the servo amplifiers for controlling axes other than the axes subjected to gravitation.

According to another aspect of the present invention, there is provided a servomotor control system for controlling servomotors through servo amplifiers respectively connected thereto by a numerical controller. The servomotor control system comprises: a plurality of serial buses for performing communications between the numerical controller and the servo amplifiers in daisy-chain; detecting means for detecting a communication failure in any of the plurality of serial buses and issuing an alarm indicating the communication failure; and selecting means for selecting stopping or continuing of the communications by each of the plurality of serial buses according to a parameter preset in the numerical controller when an alarm of the communication failure or a system failure of the numerical controller is inputted, so that the servo amplifiers connected to the plurality of serial buses are selectively operable.

According to the present invention, outputs of servo amplifiers connected to a serial bus in which a communication failure occurred is made zero and outputs of the servo amplifiers connected to a serial bus in which a communication failure does not occur is maintained so that the servomotors can be controlled. Therefore, when a failure is caused, controllable motors can be stopped or driven to move a machine at a safe position, so that the machine and a workpiece can be prevented from being damaged and safety of an operator is enhanced.

DETAILED DESCRIPTION

A numerical controller according to the present invention will now be described referring to FIG. 1, a serial communication function of the numerical controller will be described referring to FIG. 2, and processing by the serial communication function will be described referring to FIGS. 3 and 4.

Figure 1:
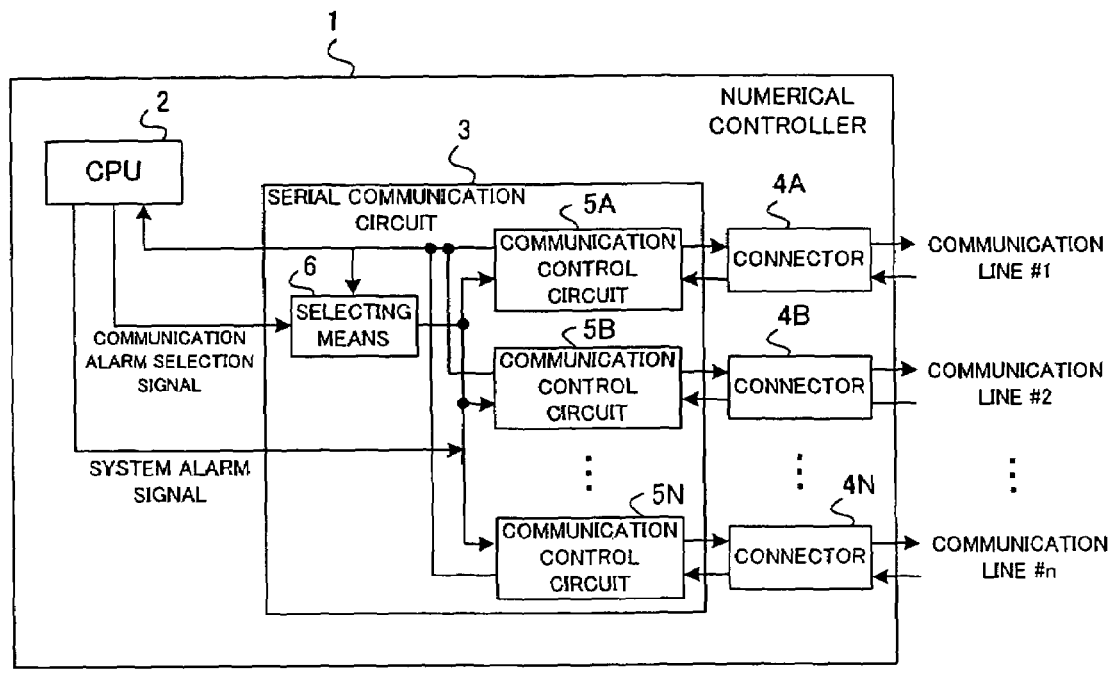
FIG. 1 is a schematic diagram for illustrating a system configuration of a numerical controller according to the present invention.
Figure 6:
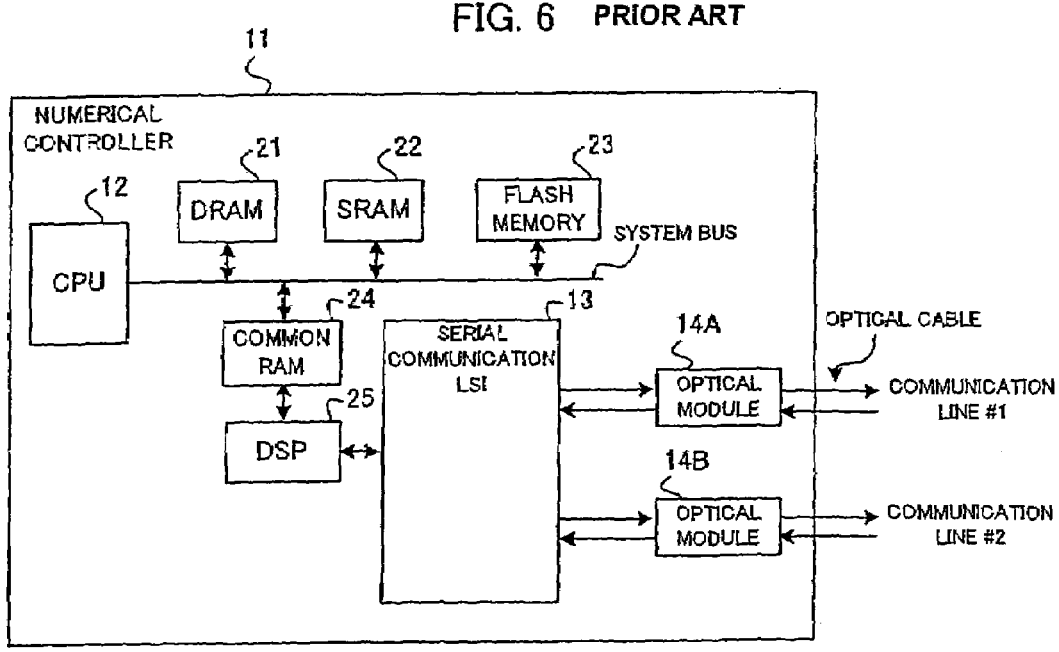
FIG. 6 is a schematic diagram for illustrating a system configuration of a numerical controller.
Figure 7:
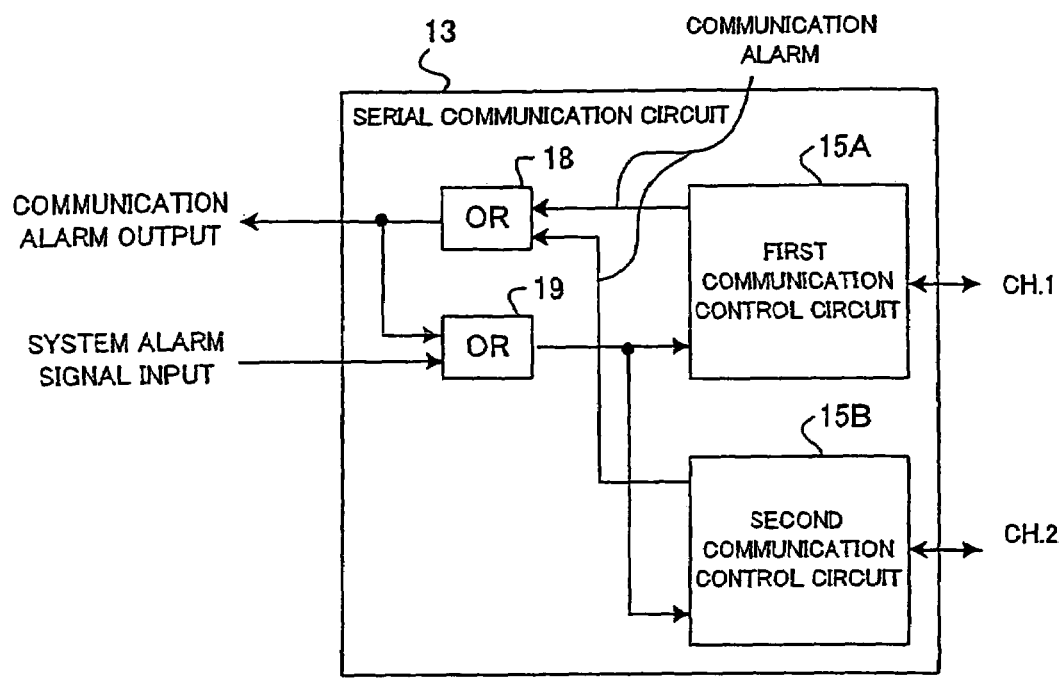
FIG. 7 is a block diagram showing an example of a serial communication LSI of the conventional numerical controller.

FIG. 1 shows an outline of a system configuration of the numerical controller of the present invention. The numerical controller 1 comprises a serial communication circuit 3 and connectors 4A to 4N for serial communication with a CPU 2 and servo amplifiers. The serial communication circuit may be composed of a serial communication LS. The CPU 2, like the one shown in FIG. 6, is provided with a DRAM, SRAM, flash memory, DSP, common RAM, etc. (not shown FIG. 1) and is connected to the serial communication circuit 3 through the common RAM and the DSP.

The CPU 2 can access the DRAM, SRAM, flash memory, and common RAM through system buses (not shown) and transfers data between the CPU 2 and the DSP via the common RAM. When the CPU 2 writes an amount of movement to the common RAM with every given period, the DSP reads the amount of movement from the common RAM, calculates current command values for motors, and transmits them to the servo amplifiers through the serial communication circuit 3, the connectors 4A to 4N, and serial buses. The connectors, like the ones shown in FIG. 6, can use an optional form corresponding to the serial buses, as well as optical modules.

On the other hand, current values for the motors, position information for the motors, etc. are transmitted from the servo amplifiers, which are daisy-chain-connected on the serial buses, to the CPU 2 through the serial buses, connectors 4A to 4N, and communication circuit 3.

The serial communication circuit 3 has a plurality of channels for transmitting and receiving serial signals. Electrical signals delivered from the channels are transmitted to communication lines (#1 to #n) through the connectors 4A–4N and sent to the servo amplifiers. If the connectors 4A–4N are composed of optical modules, the signals are subjected to electrical-to-optical conversion. Thus, these signals are optical signals when they are delivered to the serial buses.

Feedback signals from the servo amplifiers are transmitted to the connectors 4 through the communication lines (#1 to #n) and delivered to the serial communication circuit 3 through the channels. If the connectors 4A–4N are composed of optical modules, the optical signals from the serial buses are subjected to optical-to-electrical conversion by the optical modules.

The serial communication circuit 3 is connected to the serial buses through the connectors 4A to 4N, and is provided with communication control circuits 5A–5N that detect communication failure of the serial buses.

Selecting means 6 has a function to select whether or not to notify the other communication control circuits 5A–5N of a communication failure, if any, of any one of the circuits 5A–5N detected thereby. A communication alarm selection signal that is transmitted from the side of the CPU 2 is used for the selection by the selecting means 6. This communication alarm selection signal may be a fixed selection signal that is preset in the numerical controller or a variable selection signal based on a parameter that is optionally set by a user.

The fixed selection signal is preset in system software that is stored in storage means such as a flash ROM. This setting is semifixed setting described in the system software, and its change requires reloading of the software. Further, the variable selection signal is set by a parameter that can be optionally set by the user or changed. The content of the selection can be freely changed by changing this parameter.

If a system alarm signal is generated, moreover, communication interruption or communication continuation is set for a predetermined communication control circuit from the side of the CPU 2. The communication control circuit for which the communication interruption or communication continuation is set can be set by a parameter on the side of the CPU 2.

In the case of a serial bus to which a servo amplifier for controlling a gravity axis is connected, for example, communication interruption is set as a selection such that the communication control circuit is not notified of any communication failure. In the case of each serial bus to which a servo amplifier for controlling any other axis than the gravity axis is connected, on the other hand, communication continuation is set as a selection such that the communication control circuit is notified of communication failure. If the communication continuation is set, the communication control circuit uses normal control signals to make emergency stop control and control for the safety of axis retraction or the like.

Figure 2:
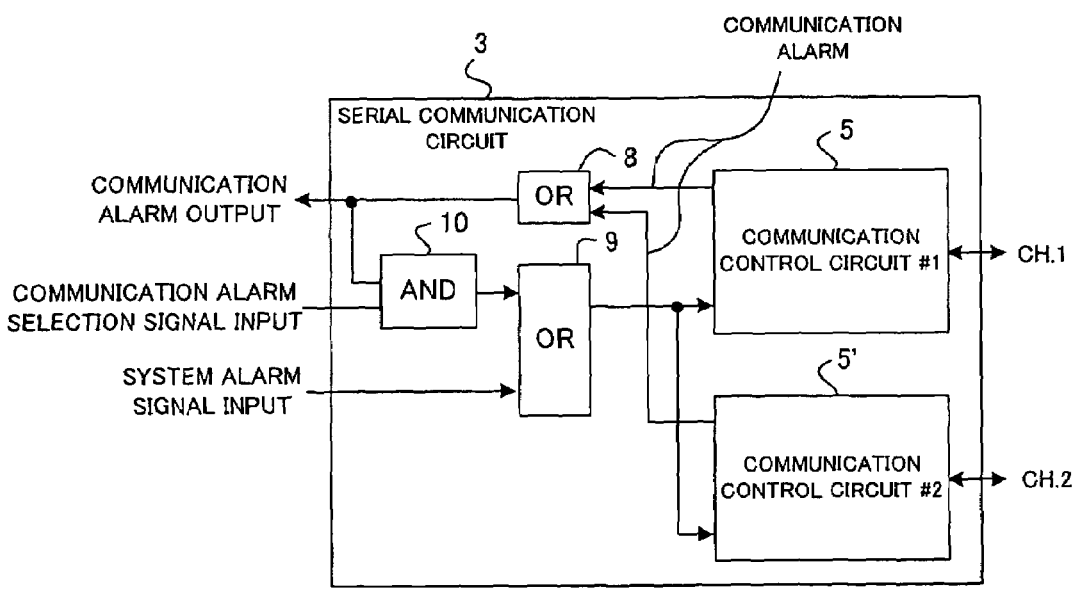
FIG. 2 is a block diagram showing an example of a configuration of a serial communication circuit of the invention.

FIG. 2 is a block diagram showing a configuration example of the serial communication circuit. The configuration example shown in FIG. 2 is provided with two communication control circuits.

The serial communication circuit 3 comprises communication control circuits 5 and 5' for controlling first and second communication lines, respectively, a first OR circuit 8, a second OR circuit 9, and an AND circuit 10.

Communication alarms that are issued from the communication control circuits 5 and 5' are delivered as external communication alarm outputs to the CPU side through the first OR circuit 8. Further, the external communication alarm outputs, along with a communication alarm selection signal issued from the CPU side, are inputted to the AND circuit 10. The output of the AND circuit 10 is inputted to the second OR circuit 9. Besides the output of the AND circuit 10, the system alarm signal from the CPU side is inputted to the second OR circuit 9. The second OR circuit 9 delivers the communication alarms selected by the communication alarm selection signal or the system alarm signal from the CPU side to the communication control circuits 5 and 5'.

The communication alarms issued from the communication control circuits 5 and 5' are inputted to one end of the AND circuit 10, and the communication alarm selection signal to the other end. With this arrangement, whether or not to input the communication alarm to the other communication control circuit can be selected by the communication alarm selection signal from the side of the CPU 2.

If the communication alarm selection signal is "1", for example, the external communication alarm outputs are not masked by the AND circuit 10. If either of the communication control circuits detects a communication failure and issues a communication alarm, the communication alarm is inputted to the other communication control circuit through the AND circuit 10. On receiving this communication alarm, the communication control circuit stops communication with the communication line, so that outputs to all the motors that are connected to the communication line are 0.

If the communication alarm selection signal is "0", on the other hand, the external communication alarm outputs are masked by the AND circuit 10. Even if either of the communication control circuits detects a communication failure and issues a communication alarm, the communication alarm is not inputted to the other communication control circuit, and an able state for communication by the communication control circuit is maintained. Thus, the motors can be controlled on the communication line that is connected to this communication control circuit, so that predetermined operation can be performed to stop or move the motors to safe positions.

The communication alarm selection signal can be set on the side of the CPU 2. More specifically, it may be selected in a semifixed manner by the system software stored in the flash ROM or selected according to a parameter of the numerical controller that is set by the user.

If the communication line suffers a failure, the other communication alarm selection signal can select and make the axis on the other communication line controllable. If the system alarm signal is inputted, moreover, the axis to be controlled by the communication line can be selected and controlled.

The selection by the communication alarm selection signal on whether or not to deliver the communication alarm output to the other communication control circuit can be set in the system software stored in the flash ROM or by the parameter. This communication alarm selection signal delivers the communication alarm output from the AND circuit 10 to the communication control circuit 5 or 5' through the second OR circuit 9. The communication control circuit to which the communication alarm output is inputted stops communication. Thereupon, outputs to the servomotors on the serial bus that is connected to this communication control circuit are 0. On the other hand, the communication control circuit to which the communication alarm output is not inputted continues communication. Thus, outputs are delivered to the servomotors on the serial bus that is connected to this communication control circuit, whereupon the predetermined operation is performed. This predetermined operation may be emergency operation or retraction operation, for example. The communication control circuits are controlled by control signals that are delivered from the CPU 2 through normal control lines.

In the case of the gravity axis, for example, control is performed to suddenly stop the axis without reducing outputs to the servo amplifiers to 0. In threading, moreover, more desirable servomotor control for safety, such as stopping of the gravity axis synchronous with a spindle, can be selected by a parameter.

Figure 3:
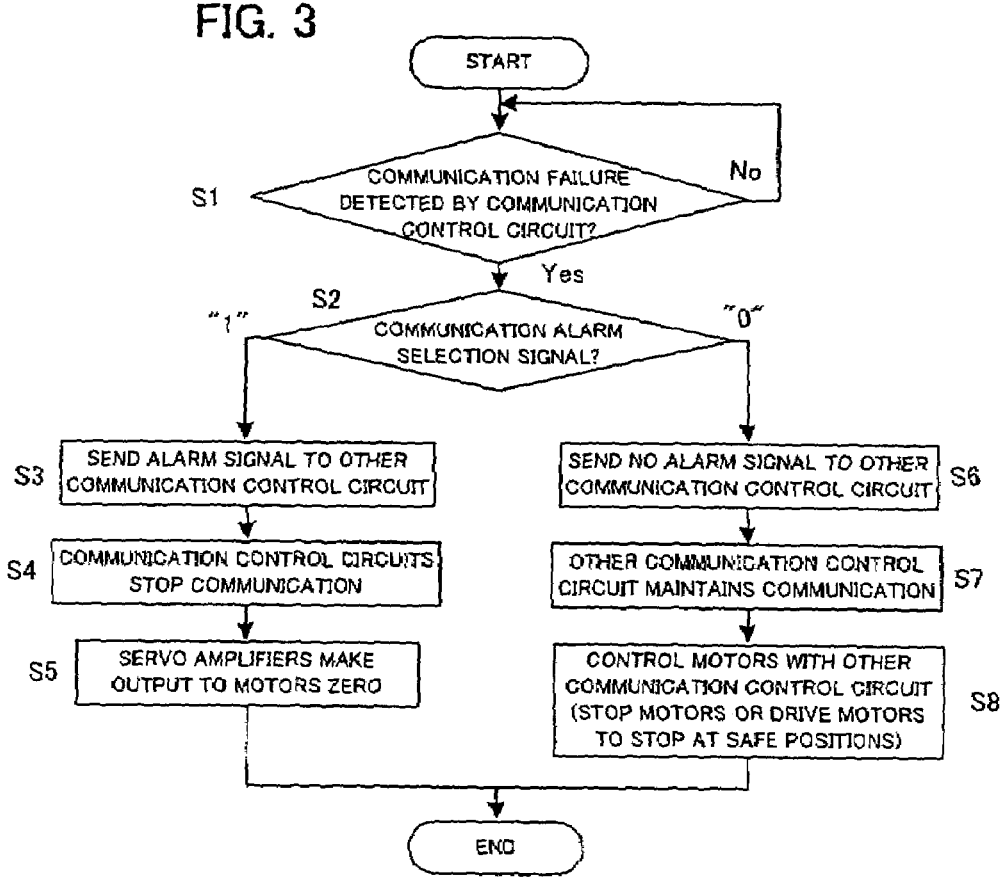
FIG. 3 is a flowchart for illustrating processing for selection performed by a serial communication function of the invention.

FIG. 3 is a flowchart for illustrating processing for selection. The communication control circuit monitors whether or not the communication line suffers a communication failure (Step S1), and generates and outputs a communication alarm to the CPU side if a communication failure is detected (Step S1).

When this communication alarm is generated, the set state of the communication alarm selection signal is discriminated. If the alarm selection signal is set so that the other communication control circuit is notified of the communication alarm ("1") (Step S2), the AND circuit 10 and the second OR circuit 9 deliver this communication alarm to the other communication control circuit (Step S3). The communication control circuits stop communication with the communication lines (Step S4) and make the outputs of the motors zero (Step S5).

If the communication alarm selection signal is concluded to be set so that the other communication control circuit is not notified of the communication alarm ("0") (Step S2), the AND circuit 10 never delivers the communication alarm to the other communication control circuit (Step S6). Since the communication alarm is not delivered, the other communication control circuit maintains the communication with the communication line (Step S7) and enables motor control to stop or move the motors to the safe positions (Step S8).

Figure 4:
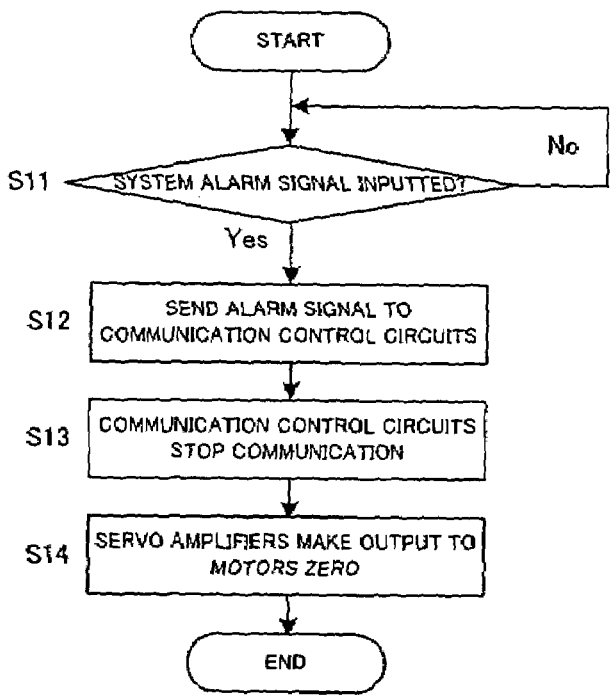
FIG. 4 is a flowchart for illustrating system alarm signal processing performed by the serial communication function of the invention.
Figure 5:
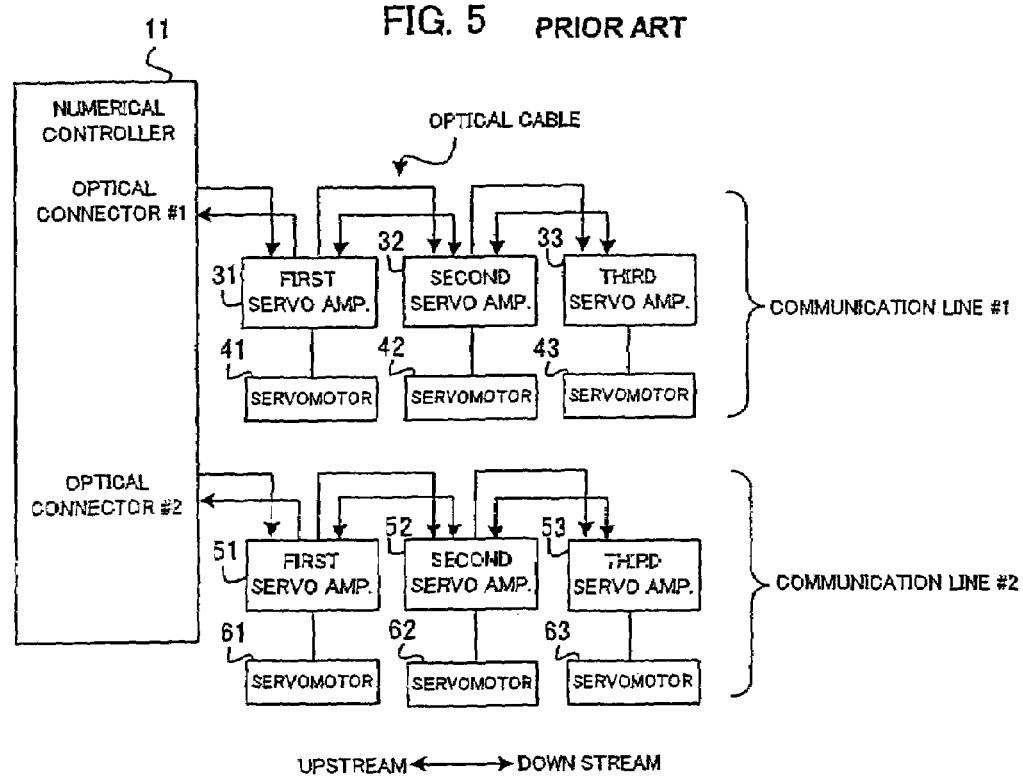
FIG. 5 is a diagram for illustrating an example of a system configuration for controlling conventional servomotors.

FIG. 4 is a flowchart for illustrating processing for the system alarm signal. The system alarm signal is monitored for input (Step S11). If the system alarm signal is inputted, the second OR circuit 9 delivers it to the communication control circuits (Step S12). On receiving the system alarm signal, the communication control circuits stop the communications by the communication line (Step S13), so that the servo amplifiers make outputs for the motors zero (Step S14).

In general, the probability of occurrence of a communication error on a communication line is proportional to the number of nodes connected to the line. Thus, an axis, such as a gravity axis, to which uncontrollability that is caused by a communication failure is very unfavorable is connected to a line to which few nodes are connected, and a communication alarm selection signal is set to "0". By doing this, control for stopping the axis or like can be performed to enhance the safety of the system even if a communication alarm is generated on any other communication line.

What is claimed is:

1. A numerical controller for controlling servomotors through servo amplifiers respectively connected thereto by performing communications with the servo amplifiers by a plurality of serial buses in daisy-chain, said numerical controller comprising:

a plurality of communication control circuits respectively controlling the communications by the plurality of serial buses and detecting a communication failure in any of the plurality of serial buses; and selecting means for selecting notification or non-notification of the communication failure, detected by any of the communication control circuits, to the other communication control circuits.

2. A numerical controller according to claim 1, wherein said selecting means selects notification or non-notification of the communication failure based on a communication alarm selection signal issued according to fixed setting in the numerical controller or according to parameter setting by a user.

3. A numerical controller according to claim 1, wherein said communication control circuits stop or continue the communications by the serial buses in response to the notification or non-notification of the communication failure.

4. A numerical controller according to claim 1, wherein said communication control circuits stop the communications by the serial buses in response to an alarm of system failure in the numerical controller.

5. A numerical controller according to claim 1, wherein said serial buses include a first serial bus to which servo amplifiers to control axes subjected to gravitation are connected and a second serial bus to which servo amplifiers controlling axes other than the axes subjected to gravitation are connected.

6. A servomotor control system for controlling servomotors through servo amplifiers respectively connected thereto by a numerical controller, said system comprising:

a plurality of serial buses to perform communications between the numerical controller and the servo amplifiers in daisy-chain;

detecting means for detecting a communication failure in any of said plurality of serial buses and issuing an alarm indicating the communication failure; and selecting means for selecting stopping or continuing of the communications by each of the plurality of serial buses according to a parameter preset in the numerical controller when an alarm of the communication failure or a system failure of the numerical controller is inputted, so that the servo amplifiers connected to the plurality of serial buses are selectively operable.

7. A method of controlling servomotors through servo amplifiers respectively connected thereto by a numerical controller, comprising:

detecting a communication failure in any of a plurality of serial buses; and selecting either notification or non-notification of the communication failure to communication control circuits, wherein communication control circuits communicating with servo amplifiers required to continue controlling the servomotors are not notified, and communication control circuits communicating with servo amplifiers not required to continue controlling the servomotors are notified.

* * * * *

UNITED STATES PATENT AND TRADEMARK OFFICE
CERTIFICATE OF CORRECTION

PATENT NO. : 7,164,965 B2 Page 1 of 1
APPLICATION NO. : 11/138266
DATED : January 16, 2007
INVENTOR(S) : Mitsuo Kurakake et al.

It is certified that error appears in the above-identified patent and that said Letters Patent is hereby corrected as shown below:

Column 5, Line 51, change "LS." to --LSI.--.

Signed and Sealed this

Twenty-second Day of May, 2007

JON W. DUDAS
*Director of the United States Patent and Trademark Office*